United States Patent [19]

Journey

[11] Patent Number: 5,793,175
[45] Date of Patent: Aug. 11, 1998

[54] PERFORMANCE EVENT SENSING FOR CONTROL OF ELECTRIC MOTOR DRIVEN GOLF CAR

[75] Inventor: James C. Journey, Hephzibah, Ga.

[73] Assignee: Textron Inc., Providence, R.I.

[21] Appl. No.: 843,010

[22] Filed: Apr. 11, 1997

Related U.S. Application Data

[63] Continuation-in-part of Ser. No. 375,549, Jan. 19, 1995, Pat. No. 5,642,023.

[51] Int. Cl.⁶ .................................................. H02P 1/00
[52] U.S. Cl. .................. 318/493; 318/376; 318/381; 318/154; 318/139; 318/373; 318/501; 318/521; 388/801; 388/803; 388/843; 388/815; 388/826
[58] Field of Search .................. 318/493, 376, 318/381, 154, 139, 373, 501, 521; 388/801, 803, 843, 815, 826

[56] References Cited

U.S. PATENT DOCUMENTS

| | | | |
|---|---|---|---|
| 3,194,715 | 7/1965 | Van Der Linde et al. | 318/139 |
| 3,566,227 | 2/1971 | Edblund | 318/258 |
| 3,597,669 | 8/1971 | Soltz | 318/17 |
| 4,079,301 | 3/1978 | Johnson | 318/338 |
| 4,090,114 | 5/1978 | Thompson | 318/139 |
| 4,264,846 | 4/1981 | Sauer et al. | 318/249 |
| 4,366,420 | 12/1982 | Omae et al. | 318/139 |
| 4,375,603 | 3/1983 | Konrad | 318/139 |
| 4,385,266 | 5/1983 | Sloan | 388/801 |
| 4,388,573 | 6/1983 | Horiuchi et al. | 318/376 |
| 4,479,080 | 10/1984 | Lamberti | 318/373 |
| 4,634,942 | 1/1987 | Naruto | 318/376 |
| 4,788,479 | 11/1988 | Rodi | 388/803 |
| 4,816,726 | 3/1989 | Novis et al. | 318/293 |
| 5,030,898 | 7/1991 | Hokanson et al. | 318/139 |
| 5,039,924 | 8/1991 | Avitan | 318/139 |
| 5,164,642 | 11/1992 | Ashiya | 318/139 |
| 5,264,763 | 11/1993 | Avitan | 319/139 |
| 5,340,202 | 8/1994 | Day | 318/376 |
| 5,453,672 | 9/1995 | Avitan | 318/493 |
| 5,565,760 | 10/1996 | Ball et al. | 318/373 X |

*Primary Examiner*—Karen Masih
*Attorney, Agent, or Firm*—Perman & Green, LLP

[57] ABSTRACT

A system is provided for controlling a D-C motor which is constructed to propel a golf car. The motor is controlled to provide performance according to a predetermined field current map which calls for a particular performance response to specified performance events. The performance events are detected by sensing actual speed and armature current and the performance response is triggered by adjustment of the field current. A performance map correlating actual speed to various events and specifying the field current response is designed for the motor used. In addition an armature current performance map is similarly constructed correlating armature current to particular performance events.

16 Claims, 6 Drawing Sheets

PERFORMANCE EVENT SENSING FOR CONTROL OF ELECTRIC MOTOR DRIVEN GOLF CAR

This application is a continuation-in-part application of application for U.S. patent application Ser. No. 08/375,549, filed Jan. 19 1995 and which issued into U.S. Pat. No. 5,642,023 on Jun. 24, 1997.

BACKGROUND OF THE INVENTION

Electric motor driven vehicles, in particular golf cars, have many unique performance requirements that pose difficult obstacles to the design of control systems for direct current motors used as the primary means of propulsion.

Drive systems of the prior art employ shunt type motors, which have their armature and field windings connected in parallel to a common source of voltage. By adapting the input power to the motor to provide independent excitation of the armature and field windings further flexibility can be achieved. It is the purpose of this invention to control an independently excited shunt motor in accordance with a predetermined field current map to provide enhanced performance in the propulsion of a golf car.

Shunt motors tend to have a characteristic response curve, namely a specific speed for a specific load. This is a result of a balancing of the input voltage and the back emf generated by the motion of the motor armature through the magnetic field established by the energized field coil. Speed and torque can be conveniently controlled by the adjustment of the voltage or current across or in either the armature or the field winding or both. Although motor control can be obtained through either the armature current or the field current, it is advantageous to rely on the variation of field current because of the lower current levels. The use of field current enables the use of low power, less expensive components that increase efficiency. It is the purpose of this invention to provide a system of control which allows operation of the motor along its full range of response characteristics in accordance with a particular armature current to field current map.

Basic speed control for such motors involves the use of a chopper circuit to supply pulses of voltage to the armature which are varied in duty cycle from 0 to 100% according to the desired speed in response to the manually operated throttle. Further refinement of the control is provided by an H bridge circuit operatively connected to vary the current in the field winding. These circuits are well known in the art.

The more sophisticated motor control circuits are now based on the operation of discrete logic or microprocessors and can function to provide a variable torque at near constant speed. An example of one such system particularly adapted to the control of electric vehicles driven by a separately excited shunt wound motor is described in U.S. Pat. No. 5,264,763. In the system of the '763 patent, the armature winding is controlled by modulating the pulse width of the voltage output of a chopper exciter circuit 17 while the field current is controlled by the H bridge circuit 16. The system of the '763 patent adjusts the armature and field voltage in response to the speed of the driven wheel. It is an object of this invention to realize the full potential of this type of control circuit to enhance the performance of the drive system for a golf car or other vehicle through the adjustment of the field current.

A great deal of design effort has been exerted to utilize the power generation characteristic of an electric motor to provide a braking action in a motor used for driving a vehicle. This can be accomplished in many ways for example by reversing the voltage on the field or armature winding, by raising field current to increase the back emf, or by providing a return path for current through the armature upon disconnecting the input power to the armature. It is a purpose of this invention to use this characteristic to enhance the performance of a golf car in its normal use.

The operation of a golf car is unique because of the uneven terrain which is continuously traversed and the continuous need for stopping and parking the car. Although a very simple control circuit can provide constant speed propulsion along a flat path, most courses are designed to challenge the golfer. Hills, valleys, bunkers, ditches and the like, all of which need to be navigated by the golf car, are a standard part of any course. It is a purpose of this invention to provide a selection of performance characteristics for common types of terrain.

In using electric motor powered golf cars, there is a continuous need for the driver to be alert to an over speed condition on down hill runs and to apply the mechanical braking system to slow down the vehicle. In gas powered golf cars the compression of the engine cylinders provides some restraining force against over speed when the car is proceeding downhill. The electric motor has no similar restraint unless the regenerative nature of the armature can be actuated to provide auxiliary braking.

It is a purpose of this invention to provide an efficient mechanism for utilizing both regenerative braking and dynamic braking depending on the performance circumstances. Regenerative braking involves the use of the back emf generated in the armature to retard rotation of the armature and therefore the speed of the golf car. Dynamic braking is accomplished by reversing the field current and dissipating the resultant energy generated as the armature rotation slows to a stop.

As in any vehicle many functions of a golf car depend on the actions of the driver. When a golf car is stopped it should be stopped on level ground and the mechanical brake must be reliably set. If the driver is negligent the car could continue to roll even though the motor is turned off. The irresponsible or forgetful driver could use a mechanism which would sense movement after the car is brought to rest. It is a purpose of this invention to sense actual speed at the axle and provide a control system having an additional operation alert function which will sense the movement of a car after it comes to rest and initiate dynamic braking in the proper direction to limit the speed of the vehicle.

The driver of a golf car also faces the opposite of the over speed event when operating the vehicle on an upward incline. In this situation the car will tend to slow down as the load on the motor increases. This will occur as the golf car proceeds up the grade, placing the driver at the mercy of the characteristic torque versus speed curve of the motor. It is a purpose of this invention to provide a control circuit which can adjust the operational performance of the motor to obtain a full range of available torque while maintaining sufficient speed.

It is the purpose of this invention to provide system of performance maps which provide predetermined field current responses. These performance maps may be grouped according to the local terrain for selection by the user.

SUMMARY OF THE INVENTION

A system is provided for controlling a D-C motor which is constructed to propel a golf car. The motor is controlled to provide performance according to a predetermined field current map which calls for a particular performance response to specified performance events. The performance events are detected by sensing actual speed and armature current and the performance response is triggered by adjustment of the field current or other appropriate parameters. A performance map correlating actual speed to various events and specifying the field current response is designed for the motor used. In addition an armature current performance map is similarly constructed correlating armature current to particular performance events. A selection of performance maps are provided which are designed for specific types of terrain, for example, level ground, all-terrain, small to medium grades, and steep grades.

The motor is a shunt wound motor having independently excited armature and field windings. The basic input to the armature of the motor is supplied through a pulse width modulated chopper circuit which varies the width of its output voltage pulse (duty cycle) in response to the throttle of the golf car. Full control of the input to the field winding is gained by the supply of power to an H bridge circuit. Armature current is continuously sensed to provide an indication of the status and performance of the car during operation. In addition actual speed of the golf car is sensed. At a predetermined level of armature current indicative of going up a hill, the field current is adjusted to provide a higher torque at a specific speed. If sensed speed indicates a predetermined over speed condition, as for example when the vehicle coasts, field current is increased to enhance regeneration and the resultant braking. After the speed sensor indicates that the vehicle has stopped, a predetermined delay is initiated and if the speed sensor indicates thereafter, that the vehicle has begun to roll, an appropriate field current can be applied to limit the speed of the car. The at rest condition is continuously monitored by the speed sensor, if movement of the car begins, the direction can be established and the circuitry will apply a current to the field winding to initiate dynamic braking.

DESCRIPTION OF THE DRAWINGS

The preferred embodiment of this invention is described in more detail below with reference to the Drawing in which.

DESCRIPTION OF THE PREFERRED EMBODIMENT

This invention is described in relation to a golf car but is applicable to any vehicle which utilizes a direct current electric motor to drive its wheels. The motor which is used consists of a shunt type with independently excited armature and field windings such as an Advanced D.C. Motors model no. AY6-4002. A typical control circuit is shown and described in U.S. Pat. No. 5,264,763 which is incorporated herein by reference.

Figure 1A:
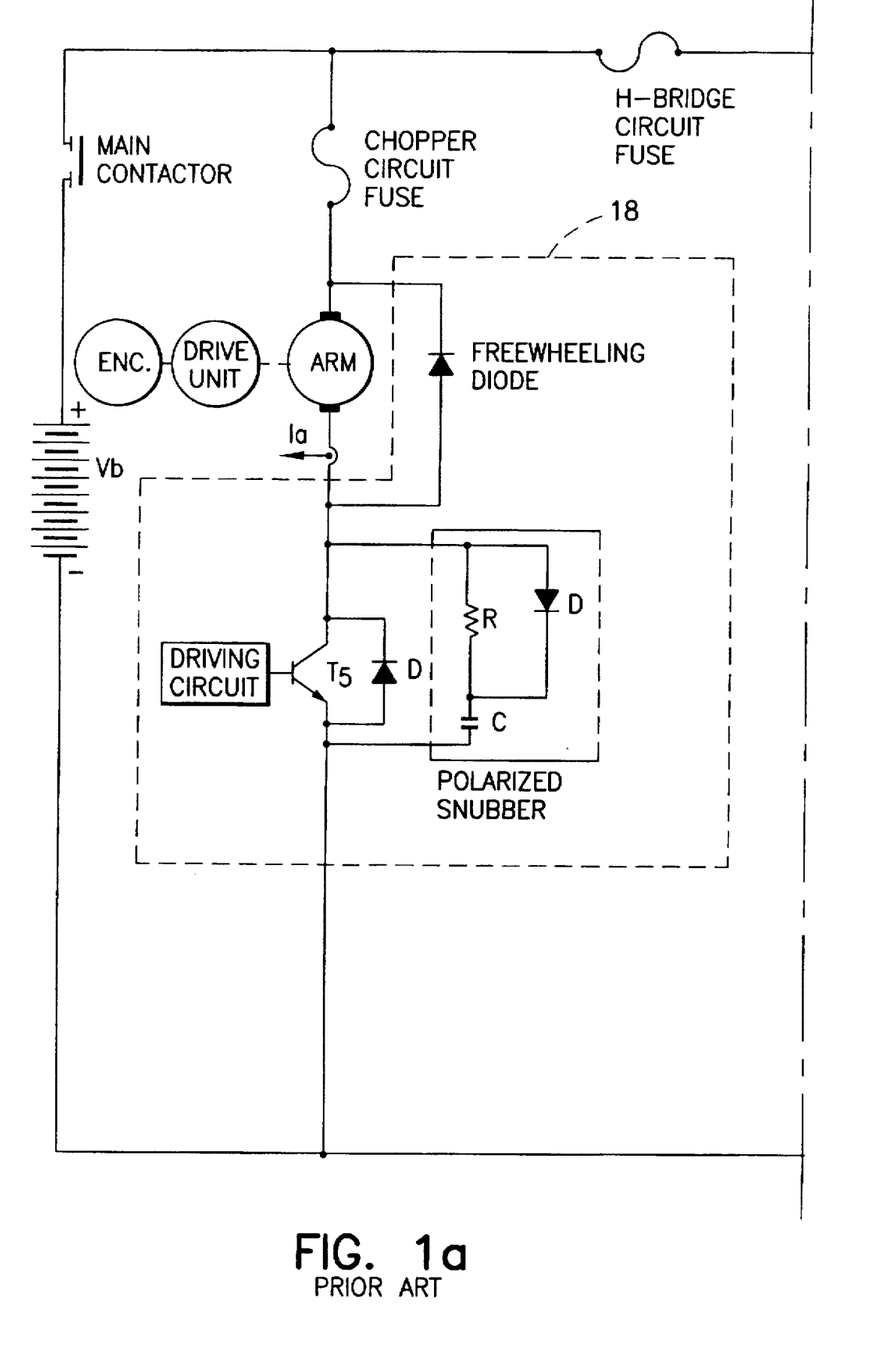
FIGS. 1a and 1b are circuit diagrams showing a control circuit of the prior art.
Figure 1B:
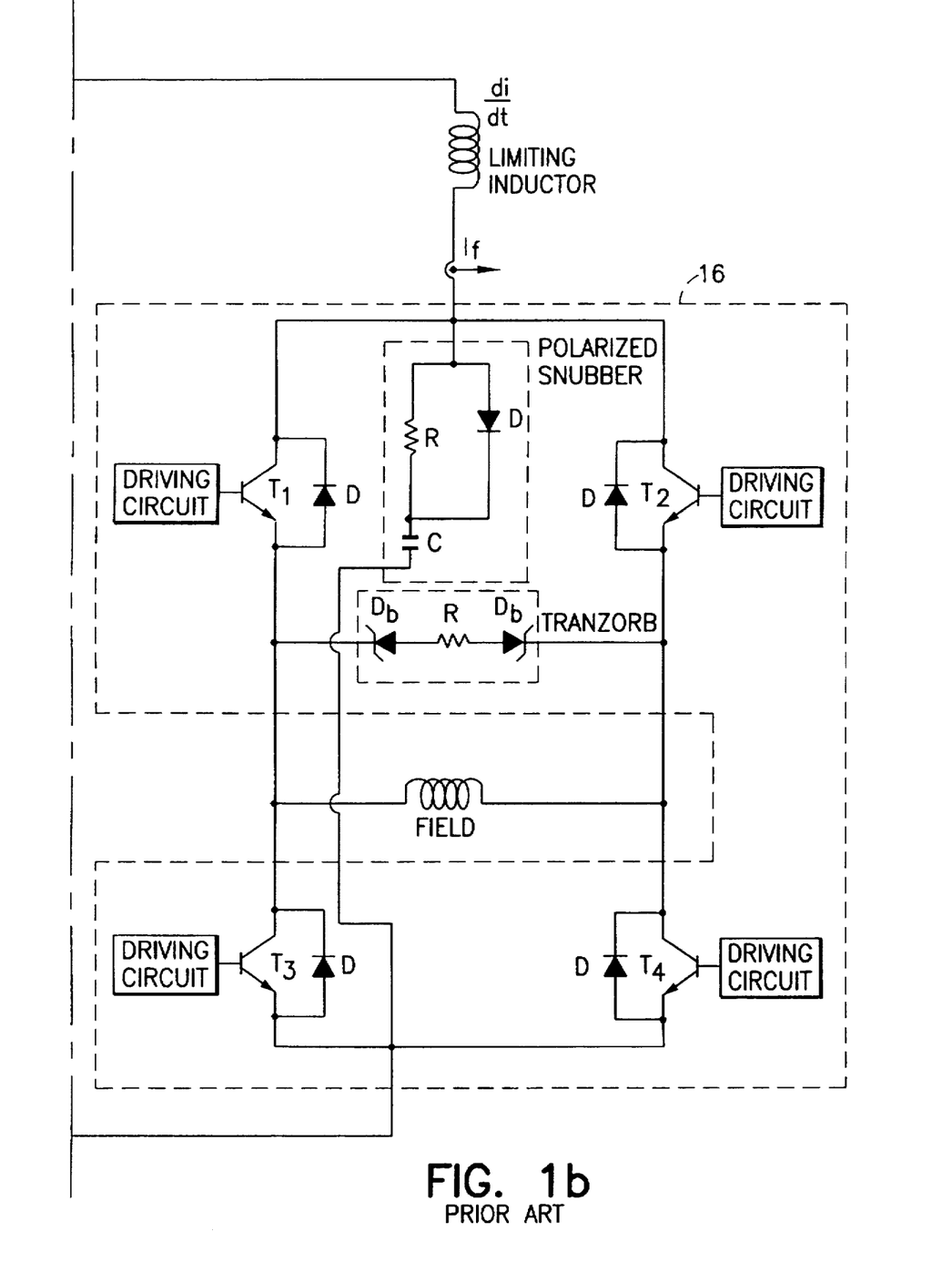
Figure 2:
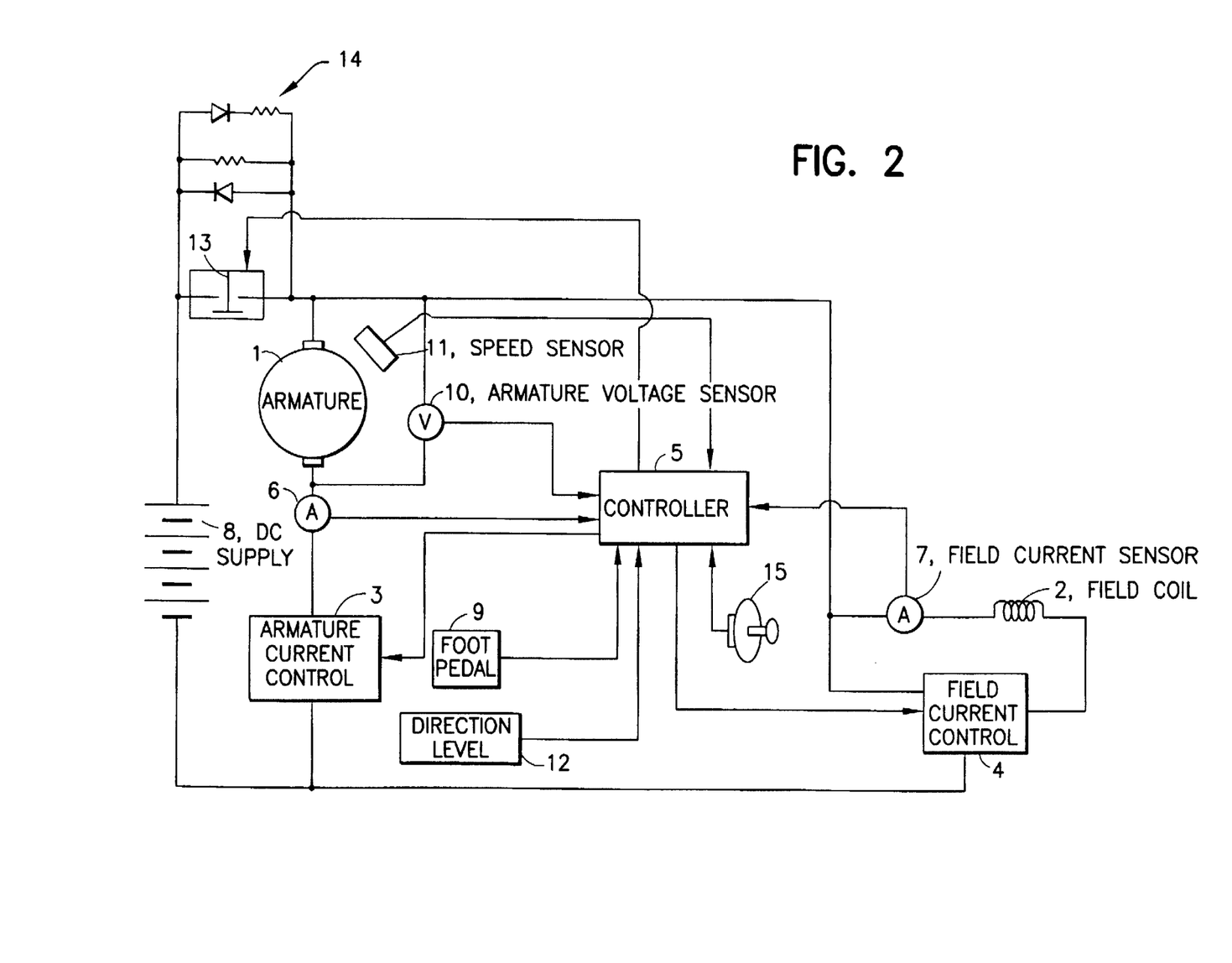
FIG. 2 is a schematic diagram depicting the flow of information among the components of the invention.

The control system of this invention is shown in FIG. 2 and consists of motor armature 1 together with its associated chopper control circuit 3 and field coil 2 together with its associated H-bridge control circuit 4. In order to provide independently controlled inputs to armature 1 and field coil 2, armature 1, with its control 3 and field coil 2, with its control 4 are each connected directly to DC supply 8 in a parallel relation as shown in FIGS. 1a and 1b as well as FIG. 2.

The armature 1 is independently excited by a chopper circuit 3 which provides a pulsed voltage to armature 1. The current through the armature is varied by modulating the pulse width of the chopper output. A typical circuit for the chopper 3 is shown at 18 of FIG. 1a. A mechanical throttle such as a foot pedal 9, shown in FIG. 2, may be employed to provide a signal to vary the chopper output.

The current through the field coil 2 is supplied through H bridge circuit 4. A typical H bridge circuit is shown at 16 of FIG. 1b. The field current is used as the main variable in the control circuit of this invention and is monitored by a current sensor 7.

An armature current monitor 6 is connected in the armature circuit to sense the current flowing in the armature and generate a signal which is used as an indicator of the performance needs of the motor in the operation of the golf car. For additional control in certain instances, a voltage sensor 10 is provided to sense the armature voltage. A controller 5 is used to adjust the field current in response to performance conditions indicated by the armature current monitor signal.

As a further means to monitor the operation of the motor, a speed sensor 11 is used to obtain signals indicative of the actual speed of the vehicle. This sensor 11 may be a simple Hall Effect device operatively associated with the armature shaft of the motor. Since this is the shaft which drives the wheels of the golf car, the speed sensor 11 will accurately reflect the actual speed of the car. The addition of the speed sensor 11 will simplify the detection of certain events, for example the starting or stopping of the car, overspeed, unintended movement, and stalling. With the speed sensor 11, armature current need not be monitored while the vehicle is stopped nor is a residual field necessary as in the prior system. The speed sensor 11 will provide a more precise regulation of vehicle top speed.

The controller 5 is a microprocessor which is constructed to provide the well known and typical functions of receiving data, storing data, comparing data, and signal generation. Controller 5 compares the actual armature current and speed to predetermined data and generates a signal to adjust the field current according to the performance requirements of the golf car. The actual field current is monitored by field current monitor 7 which generates a signal to allow the controller 5 to determine when the current in field coil 2 is at the desired level. Controller 5 continuously compares the actual field current to the desired field current level generated at specific values of armature current.

Referring to FIG. 2, the typical motor used to propel a vehicle such as a golf car has an armature 1 which is mounted for rotation through a magnetic field set up by a field coil 2. The armature 1 and field coil 2, with their associated control circuits 3 and 4 respectively, are connected in parallel to a common DC voltage source such as a battery 8. A solenoid 13 controls the current to the armature control circuit 3 and can be actuated by the controller 5 when keyed switch 15 indicates the need to turn on the motor.

As indicated above, the armature 1 and field coil 2 are independently excited. Under normal operating conditions, the motor is controlled through adjustment of the output of chopper circuit 3 by a throttle 9, such as a foot pedal. A sensor is provided on the foot pedal which generates a signal, the amplitude of which is proportional to the distance the pedal is depressed. In addition a separate micro switch indicates when the throttle is engaged or released. Forward or Reverse modes of operation may be selected by a direction lever 12, the position of which is indicated by micro switches operatively associated with the lever 12. These indications are fed to the controller 5 to provide data relating to the sensed positions of the throttle 9 and lever 12.

Figure 4:
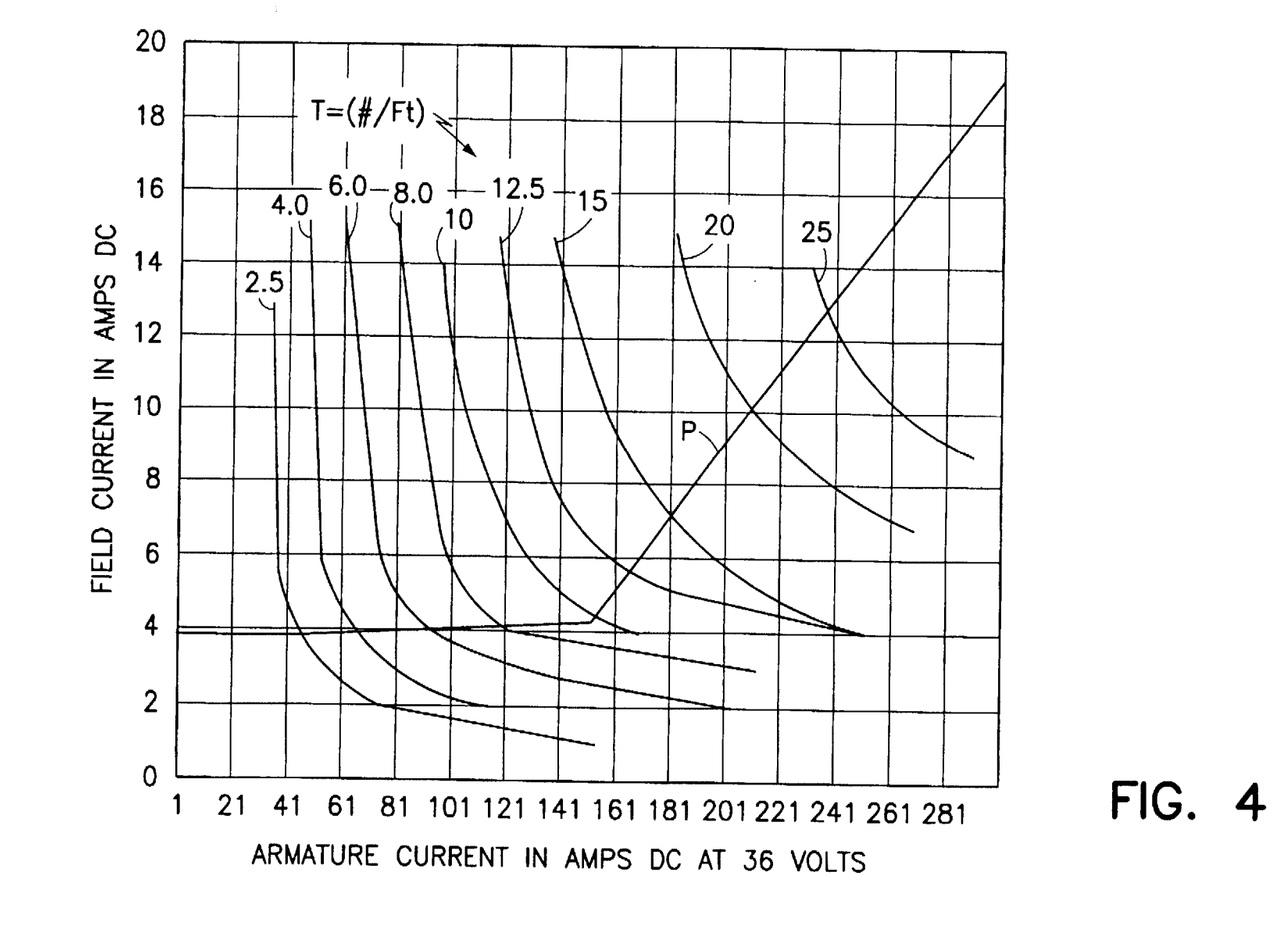
FIG. 4 is a chart showing torque curves and a performance profile for the motor controlled by the system of this invention.

As the armature 1 moves through the magnetic field of the field coil 2, it will act as a generator and a counter or back emf will be generated in opposite polarity to the supply voltage. This characteristic tends to limit the torque available at a given field current. Typical torque curves T of a shunt motor appropriate for use as the driver of a golf car are shown in FIG. 4. By varying the field current, increased torque becomes available and a performance profile P is obtained. This is advantageous because compromises must otherwise be made to provide the required torque at a reasonable speed throughout the operating profile of the golf car.

The back emf also tends to retard the rotation of the armature and this characteristic, generally referred to as regenerative braking provides a mechanism to slow the car. H bridge circuit 4 is particularly well adapted to enhance the effects of braking through adjustment of the field in the proper direction to increase the back emf. Circuit 4 can also accomplish field current reversal in opposition to armature rotation to provide dynamic braking. In the instance of regenerative braking, a current may be generated which is fed back to the battery through path 14. During dynamic braking, a majority of the current generated is dissipated in the armature.

Since armature current is directly effected by the generation of the back emf, armature current provides a convenient indicator of some particular conditions which, without control adjustment, could result in undesirable performance.

Through the investigation of the performance profile of a particular motor, data indicative of certain performance events can be developed. By comparing the performance event data with actual data, an optimum response profile consistent with a particular application is compiled. In this manner a performance map can be developed which relates particular performance events to appropriate responses. By an analysis of the information sensed in the system, such as speed and direction, armature current and voltage, and other parameters, a performance map is extrapolated which relates actual data to desired performance and needed adjustment. In the system of this invention two basic maps are provided, a map relating to stopping and starting, and a map relating to movement of the vehicle on grades.

Each map consists of individual performance events or conditions, the actual parameter value or values that indicate the occurrence of an event or the presence of a condition, and a desired field current or in some instances armature voltage which enhances performance of the event. These maps are stored in controller 5 for reference when the sensors indicate the presence of a predetermined condition. Controller 5 can then compare actual field current to the desired field current from the map and adjust the field current accordingly.

The Map of Motion Related Events

Figure 3:
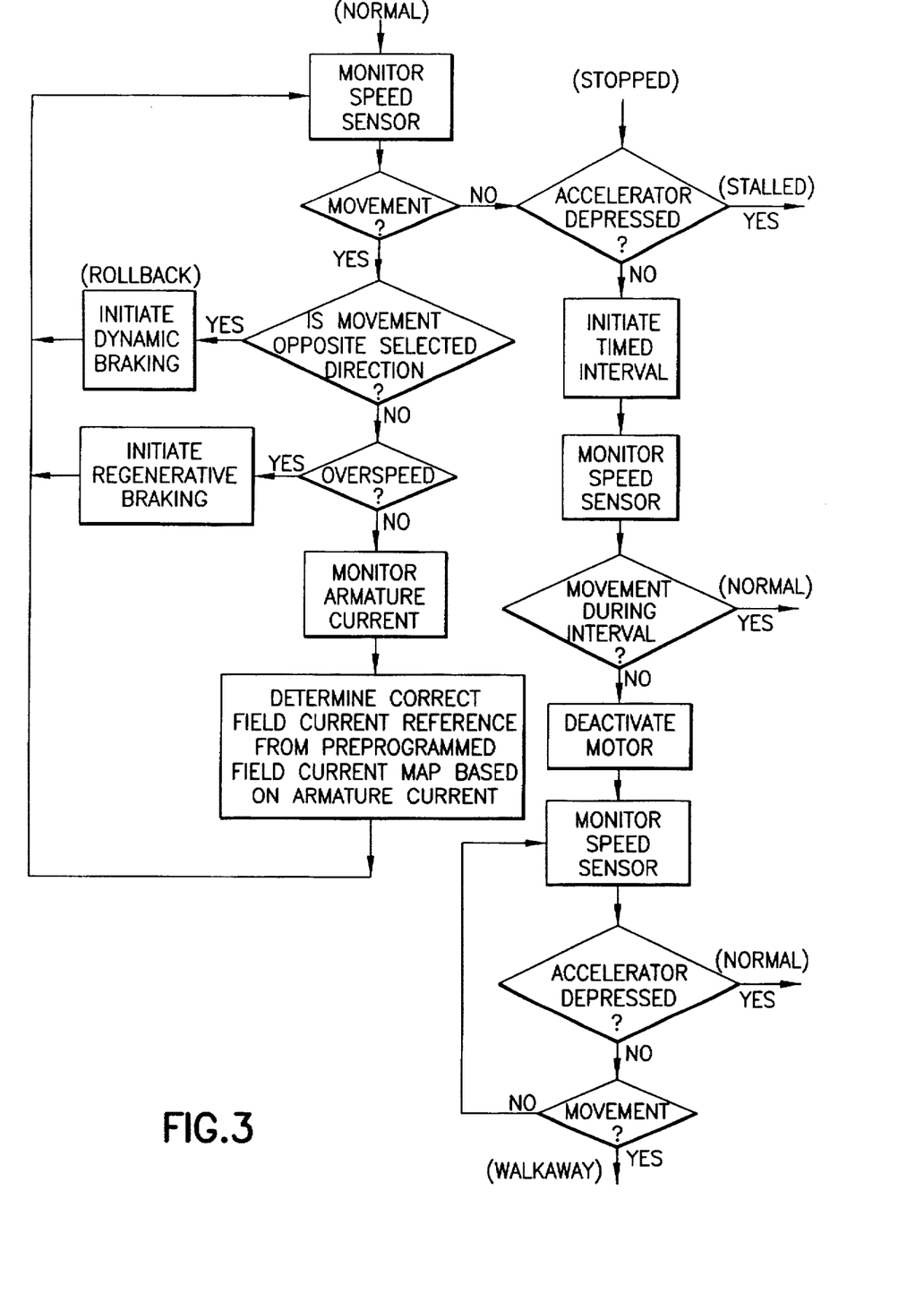
FIG. 3 is a flow diagram for the operation of this invention for controlling the speed and torque characteristics of the motor during movement and when the throttle is released.

In the normal operation of this invention as illustrated in FIG. 3, the controller 5 is supplied with data relative to a condition of speed decay caused by the golf car proceeding up a hill or other inclined surface. At this time more torque is needed and the speed tends to decline. The normal operating range of armature current used in a golf car type vehicle is approximately 0 to 300 amperes depending on a wide variety of factors. On level ground it is anticipated that the motor used in this particular application will draw approximately 35 amps while proceeding at a reasonable speed. As the golf car begins to climb a hill, the armature current may jump to 150 amps or more depending on the grade. In the present system when the actual armature current reaches a preset data point such as 150 amps, an adjustment signal is generated to cause a change in the field current which will increase the torque available. Several armature current levels may be designed into the controller 5 which correspond to the armature current expected at a specific grade. In the preferred embodiment, at a predetermined armature current level, a signal is generated proportional to the desired field current. The field current is then adjusted to provide increasing torque at a consistent speed. In this manner the uphill performance of the golf car is greatly improved. A performance curve P is illustrated in FIG. 4. These data will vary according to the characteristic curves T of the electric motor used. As shown in curve P of FIG. 4, the field current can be varied between approximately 0 to 20 amps. As shown, under normal conditions, the field current is held at approximately 4 amps and then increased or decreased, as required, when a predetermined current level is reached.

Once the hill is climbed and the golf car proceeds over the crest, a new performance requirement occurs. The torque load on the motor begins to decrease as gravity begins to assist the progress of the car, resulting in an acceleration of the vehicle speed. This is an undesirable effect and the operator of the golf car is called upon to release the throttle 9 and use the mechanical braking system. During this mode of operation the back emf of the armature 1 begins to increase and the armature current will drop because the motion of the vehicle is now driving the armature 1 as opposed to the reverse in normal operation. A level of, for example 0 amps armature current at full operating voltage would indicate an over speed condition. Reliance on armature current as an indicator of over speed, however, may be cumbersome.

In the system of this invention the speed sensor signal is used and compared to a specific speed limit for the application. In the golf car, a speed of between 13 or 14 miles per hour is a reasonable limit and this can be set in a performance map for reference by the controller 5. Controller 5 will generate a responsive change in field current, if overspeed occurs. The field current adjustment in response to overspeed will be to enhance the effect of regenerative braking, namely by increasing the field current.

In this manner, a map of performance events is developed based upon the performance on hilly terrain. By anticipating what field current is needed at a particular event, the performance may be immediately enhanced as the need arises.

The Map of Stopping, Starting and Over speed

Figure 6:
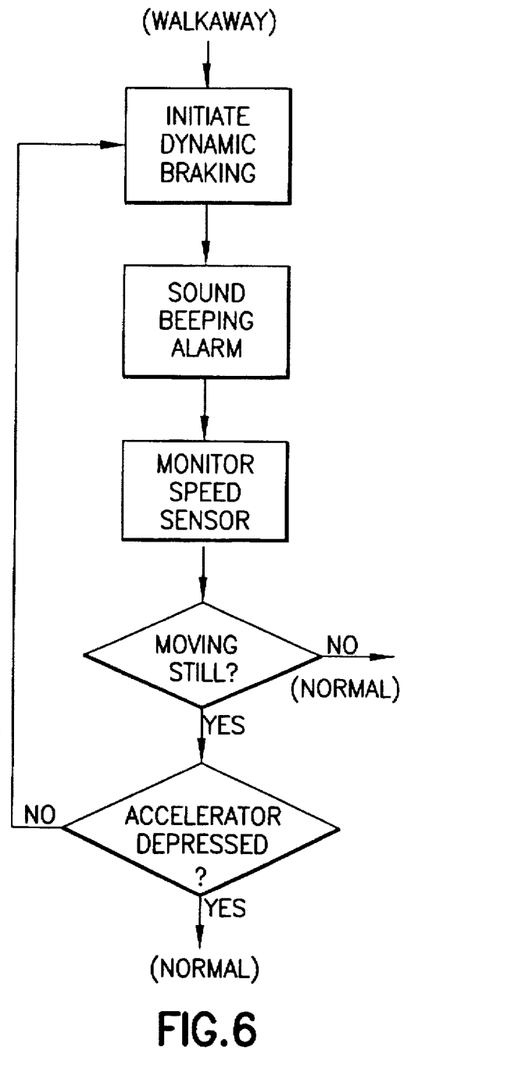
FIG. 6 is a flow diagram for the operation of this invention for controlling the motor during the stopped condition.

One of the dominant modes of operation of a golf car is the need to frequently stop the car and park. This can create problems depending on the nature of the ground where the car is parked. Mechanical brakes are dependent on the driver to operate and need to be set. A forgetful or negligent driver could face the situation that the car continues to roll after it is parked. In this case a zero speed signal indicates a stopped condition. As shown in FIG. 3, upon the receipt of a zero speed signal, the controller 5 initiates a timed interval of about 2 seconds. If, after the interval has expired, the throttle is not depressed, a stopped condition is indicated. The controller 5 is provided with such data and responds by deactivating the motor. Deactivation is accomplished by reducing the duty cycle of control circuits 3 and 4 to zero and opening solenoid 13. Thereafter the controller 5 continues to monitor signals from the speed sensor to insure movement does not occur. In the event that movement begins, as indicated by the speed sensor, dynamic braking is applied. This event is referred to as walkaway in FIG. 6.

The speed sensor generates a signal proportional to the actual speed of the golf car while the field current monitor will generate a signal relative to the direction of movement. These speed signals are received by the controller 5, as shown in FIG. 2, and provide a basic indication of whether the vehicle is moving and in which direction, forward or reverse. As shown in FIG. 3, the speed signals allow the controller 5 to determine if the vehicle is moving opposite to the direction indicated by the position of the transmission lever 12. This indication will match a roll back condition on a hill identified in the performance map which is supplied to the controller 5. In this case a field current would be generated to oppose the movement and employ dynamic braking. If the speed signal is consistent with the movement desired by the user, the performance map will be searched for speed limit data to determine if an over speed condition is present. When over speed is indicated, regenerative braking will be initiated.

Figure 5:
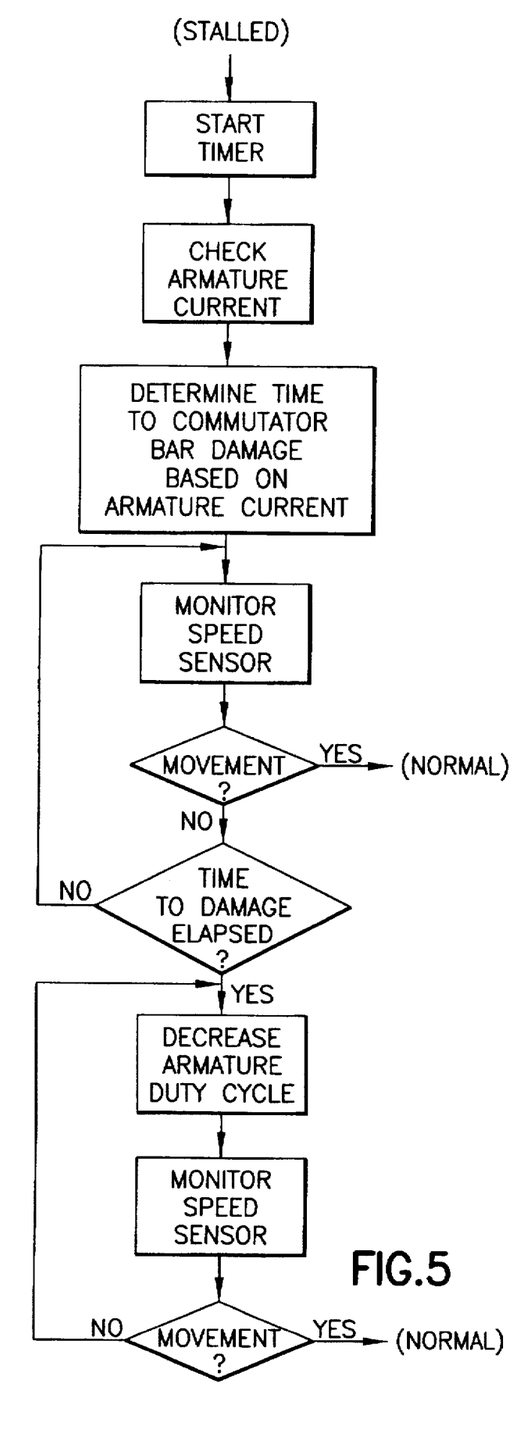
FIG. 5 is a flow diagram for the operation of this invention for controlling the motor during the stalled condition.

The use of an indicator of speed also provides critical data during a stalled condition. A zero speed signal in association with a depressed throttle will indicate a condition which may generate excessive armature current through a single point on the commutator. Such a situation could result while using the motor to hold position on a hill or while the car is impeded by an obstacle. If the condition is allowed to continue for an extended period, damage to the motor commutator could result. In the performance map, a time limit is provided, after which the armature control circuit duty cycle will be reduced as needed to avoid damage. This may be accomplished in steps with a reduction in armature duty cycle occurring at an interim points. The flow diagram of FIG. 5 illustrates the information processing of the performance map of the stalled condition. The time limit is contained in a look-up table stored in controller 5 which relates time, armature current and current limits.

Under certain conditions, dynamic braking is provided. Dynamic braking involves the reversal of the field current to oppose the movement of the vehicle. The energy generated in dynamic braking is generally dissipated as heat in a resistive load. In the system of this invention dynamic braking is used and dissipated through the armature as the load. This type of braking is called "plug" braking. This option is made available when the throttle pedal 9 is released indicating a desire to stop, thereby creating another event and response for the performance map referred to as a walkaway. The information processing of this condition is shown in FIG. 3. Dynamic braking is also the response to a rollback event.

The performance map of this invention is comprised of several basic speed indications, events and responses as described above. These may be selectively grouped for selection where the terrain has consistent characteristics for example flat ground, hills, severe grades or all terrain. Through the use of appropriate means, for example, switches or plug in data cards, the controller 5 is instructed to use the map which accommodates the particular terrain.

For example, a flat ground map may be designed with a higher speed for the overspeed condition or dynamic braking may be limited.

In this manner speed is used as an effective control parameter and a simplified mechanism for providing an enhanced performance profile.

What is claimed is:

1. In an electric motor used to propel a golf car under the control of an operator, said motor having armature and field coils which are independently excited by a source of voltage to generate armature and field currents, said motor having a characteristic performance profile, a method of controlling the motor to obtain a desired performance profile comprising the steps of:

(i) sensing the armature current of the motor and generating a signal relative thereto;

(ii) sensing the field current of the motor and generating a signal relative thereto;

(iii) sensing the speed of the golf car and generating a signal relative thereto;

(iv) predetermining armature current levels in the characteristic performance profile of the motor which are indicative of specific operational events;

(v) predetermining speed values indicative of specific operational events;

(vi) predetermining field current levels which will enhance performance of the motor in response to the specific operational event to obtain the desired performance profile;

and said predetermined, armature current levels to identify the occurrence of an operational event;

(viii) comparing said speed signal and said predetermined speed value to identify the occurrence of an operational event;

(ix) generating a field current adjustment signal for the specific operational event in accordance with said predetermined field current levels, when said armature current signal indicates an operational event has occurred; and (x) comparing the field current signal with the field current adjustment signal and adjusting the field current to obtain the predetermined field current.

2. In an electric motor used to propel a golf car under the control of an operator having armature and field coils which are independently excited by a source of voltage to generate armature and field currents, a method of controlling the motor to obtain a desired performance profile comprising the steps of:

(i) sensing the field current of the motor and generating a signal relative thereto;

(ii) sensing the speed of rotation of the motor and generating a signal relative thereto;

(iii) predetermining speed values indicative of specific operational events;

(iv) predetermining field current levels which will enhance performance of the motor in response to the specific operational event to obtain the desired performance profile;

(v) comparing said speed signal and said predetermined speed value to identify the occurrence of an operational event;

(vi) generating a field current adjustment signal for the specific operational event in accordance with said predetermined field current levels, when said armature current signal indicates an operational event has occurred; and (vii) comparing the field current signal with the field current adjustment signal and adjusting the field current to obtain the predetermined field current.

3. In an electric motor used to propel a golf car under the control of an operator having armature and field coils which are independently excited by a source of voltage to generate armature and field currents, said motor having a characteristic performance profile, a method of controlling the motor to obtain a desired performance profile as described in claim 2 comprising the further steps of:

setting a predetermined speed value at zero;

sensing a condition when the operator desires to reduce the speed of the golf car to zero;

initiating a timed interval when the sensed speed is zero; and generating a field current adjustment signal, upon the expiration of said timed interval, if the sensed speed is other than zero, said adjustment signal causing the field current to be applied to initiate dynamic braking.

4. In an electric motor used to propel a golf car under the control of an operator having armature and field coils which are independently excited by a source of voltage to generate armature and field currents, said motor having a characteristic performance profile, a method of controlling the motor to obtain a desired performance profile as described in claim 2 comprising the further steps of:

setting a predetermined speed value at zero;

sensing a condition when the operator desires to reduce the speed of the golf car to zero;

initiating a timed interval when the sensed speed is zero; and generating an adjustment signal, upon the expiration of said timed interval, if the sensed speed is zero, said adjustment signal causing the source of voltage to the armature to be reduced to zero.

5. In an electric motor used to propel a golf car under the control of an operator having armature and field coils which are independently excited by a source of voltage to generate armature and field currents, a method of controlling the motor to obtain a desired performance profile as described in claim 2 comprising the further steps of:

setting a predetermined speed value at substantially zero;

sensing a condition when the operator desires to cause the motor to move the golf car;

initiating a timed interval when the sensed speed is zero; and generating an adjustment signal upon the expiration of said timed interval if the sensed speed is still zero, said adjustment signal reducing the source of voltage to the armature as needed to prevent damage to the motor.

6. In an electric motor used to propel a golf car under the control of an operator having armature and field coils which are independently excited by a source of voltage to generate armature and field currents, a method of controlling the motor to obtain a desired performance profile as described in claim 2 comprising the further steps of:

sensing a condition when the motor is propelling the golf car;

setting a predetermined speed of the golf car at a specific maximum speed; and generating a field current adjustment signal when the sensed speed is in excess of said predetermined maximum value, said adjustment signal causing an increase in the field current to enhance regenerative braking.

7. In an electric motor having armature and field coils which are independently excited by a source of voltage to generate armature and field currents, said motor having a characteristic performance profile, a method of controlling the motor to obtain a desired performance profile as described in claim 2 further comprising the steps of:

sensing the direction in which the operator desires to propel the golf car;

setting a predetermined condition when the movement of the golf car is reverse to the desired direction; and generating a field current adjustment signal upon said sensed direction being reverse to the desired direction, said adjustment signal causing the field current to be applied to initiate dynamic braking.

8. In an electric motor used to propel a golf car under the control of an operator having armature and field coils which are independently excited by a source of voltage to generate armature and field currents, said motor having a characteristic performance profile, a method of controlling the motor to obtain a desired performance profile as described in claim 1 further comprising the steps of:

selecting a plurality of said predetermined armature current levels, speed values and field current levels into predetermined groups in accordance with a desired performance profile for a characteristic terrain; and selecting a class in accordance with the actual terrain.

9. Apparatus for controlling the performance of a DC motor used for driving a golf car comprising:

a source of d. c. voltage;

a motor armature connected to the voltage source through an armature control circuit to provide independent control of the armature;

a motor field winding magnetically coupled to the motor armature in operative relation and connected directly to the source of voltage through a field winding control circuit to provide control of the field winding independent of the armature;

an armature current monitor connected to sense the current in the armature and to generate a signal relative thereto;

a field current monitor connected to sense the current in the field winding and to generate a signal relative thereto;

a speed monitor connected to sense the movement of the golf car and to generate a signal relative thereto;

a controller connected to receive signals from the armature current, field current and speed monitors and further comprising:

means to receive predetermined armature current values indicative of specific performance conditions;

means to receive predetermined speed values indicative of specific performance conditions;

means to receive predetermined field current values indicative of the desired performance response to said predetermined condition;

means to compare said armature current signals with said predetermined armature current value to identify the occurrence of a performance condition;

means to compare said speed signal and said predetermined speed value to identify the occurrence of a performance condition;

means to compare said field current monitor signal with said predetermined field current value for the desired response to said identified predetermined condition and to generate a signal relative to the field current adjustment necessary to obtain said response; and wherein the field winding control circuit adjusts the field current in response to the field current adjustment signal.

10. Apparatus for controlling the performance of a DC motor used for driving a golf car as described in claim 9 further comprising means to sense the motor being denergized and wherein:

a predetermined speed value is set at zero; and the controller, in response to the signal of the speed monitor indicating a speed of zero, initiates a timed interval and, upon the expiration of said interval, generates a signal to cause the field current winding control circuit to reverse the direction of the field current and cause dynamic braking, if the signal of the speed monitor indicates a speed of other than zero.

11. Apparatus for controlling the performance of a DC motor used for driving a golf car as described in claim 9 wherein:

a predetermined speed value is set at zero; and the controller, in response to the signal of the speed monitor indicating a speed of zero, initiates a timed interval and upon the expiration of said interval, generates a signal to cause the armature control circuit to reduce the voltage to the armature to zero if the speed value signal of the speed monitor still indicates a speed of zero.

12. Apparatus for controlling the performance of a DC motor used for driving a golf car as described in claim 9 further comprising means to sense a condition when the motor is energized to cause movement of the golf car, and further wherein:

a predetermined speed value is set at zero; and the controller, in response to the signal of the speed monitor indicating a speed of zero, initiates a timed interval and, upon the expiration of said timed interval, generates a signal to cause the armature control circuit to reduce the voltage to the armature as needed to prevent damage to the motor, if the signal of the speed monitor still indicates a speed of zero.

13. Apparatus for controlling the performance of a DC motor used for driving a golf car as described in claim 9 further comprising means to sense a condition when the golf car is moving and further wherein:

a predetermined speed value is set at a predetermined maximum value; and the controller, in response to the signal of the speed monitor indicating a speed in excess of said predetermined maximum value, generates a field current adjustment signal to cause an increase in the field current to enhance regenerative braking.

14. Apparatus for controlling the performance of a DC motor used for driving a golf car as described in claim 9 further comprising:

means to sense a condition when the motor is energized to cause movement of the golf car in a particular direction; and means to sense the actual direction of movement of the golf car; and further wherein the controller, in response to the actual direction of movement being opposed to the energized direction, generates a signal to cause the filed winding control circuit to reverse the direction of the field current to cause dynamic braking in opposition to the actual movement.

15. Apparatus for controlling the performance of a DC motor used for driving a golf car as described in claim 9 wherein the controller further comprises:

means to receive a plurality of said predetermined armature current values, speed values, and field current values grouped in accordance with the desired performance profile for a characteristic terrain; and means to select a group in accordance with the actual terrain.

16. Apparatus for controlling the performance of a DC motor used for driving a golf car comprising:

a source of d. c. voltage;

a motor armature connected to the voltage source through an armature control circuit to provide independent control of the armature;

a motor field winding magnetically coupled to the motor armature in operative relation and connected directly to the source of voltage through a field winding control circuit to provide control of the field winding independent of the armature;

a field current monitor connected to sense the current in the field winding and to generate a signal relative thereto;

a speed monitor connected to sense the movement of the golf car and to generate a signal relative thereto;

signal relative thereto;

a controller connected to receive signals from the field current and speed monitors and further comprising:

means to receive predetermined speed values indicative of specific performance conditions;

means to receive predetermined field current values indicative of the desired performance response to said predetermined condition;

means to compare said speed signal and said predetermined speed value to identify the occurrence of a performance condition;

means to compare said field current monitor signal with said predetermined field current value for the desired response to said identified predetermined condition and to generate a signal relative to the field current adjustment necessary to obtain said response; and wherein the field winding control circuit adjusts the field current in response to the field current adjustment signal.

* * * * *